United States Patent [19]

Nosker et al.

[11] Patent Number: 5,789,477
[45] Date of Patent: Aug. 4, 1998

[54] COMPOSITE BUILDING MATERIALS FROM RECYCLABLE WASTE

[75] Inventors: Thomas Jerome Nosker, Stockton; Richard William Renfree, Scotch Plains, both of N.J.

[73] Assignee: Rutgers, The State University, New Brunswick, N.J.

[21] Appl. No.: 704,889

[22] Filed: Aug. 30, 1996

[51] Int. Cl.$^6$ ............... C08K 7/04; C08K 3/40; C08K 5/01; C08J 11/04
[52] U.S. Cl. ............... 524/494; 524/493; 524/23; 523/204; 523/214; 523/513; 523/527; 428/384; 428/903.3; 521/40.5; 521/41
[58] Field of Search ............... 524/494, 493, 524/23; 428/311.5, 384, 903.3; 523/204, 214, 217, 527, 513; 521/40.5, 41

[56] References Cited

U.S. PATENT DOCUMENTS

| | | | |
|---|---|---|---|
| 4,035,550 | 7/1977 | Suh et al. | 524/494 |
| 4,108,377 | 8/1978 | Potter | 238/91 |
| 4,137,198 | 1/1979 | Sachs | 521/154 |
| 4,229,947 | 10/1980 | Piazza | 428/71 |
| 4,303,707 | 12/1981 | Prior | 427/397 |
| 4,735,988 | 4/1988 | Takada et al. | 524/505 |
| 5,053,274 | 10/1991 | Jonas | 428/332 |
| 5,063,862 | 11/1991 | Saly | 110/346 |
| 5,155,146 | 10/1992 | Reetz | 524/13 |
| 5,238,734 | 8/1993 | Murray | 428/292 |
| 5,304,422 | 4/1994 | Tanabe et al. | 428/392 |
| 5,312,858 | 5/1994 | Folsom | 523/129 |

Primary Examiner—Vasu Jagannathan
Assistant Examiner—Olga Asinovsky
Attorney, Agent, or Firm—Lerner, David, Littenberg, Krumholz & Mentlik

[57] ABSTRACT

A composite building material is disclosed produced from recycled materials. The composite building material is composed of an extruded mixture of high density polyethylene and a thermoplastic coated fiber material such as fiberglass. The resulting material has increased strength and is useful in high stress applications such as railroad ties.

22 Claims, 1 Drawing Sheet

COMPOSITE BUILDING MATERIALS FROM RECYCLABLE WASTE

FIELD OF THE INVENTION

The present invention relates to the fields of waste recovery, recycling and building material production and use.

BACKGROUND OF THE INVENTION

There are several types of chemically treated lumber such as creosoted lumber and pressure treated lumber. These materials are enjoying an ever increasing level of popularity for use in, for example, guard rails, railroad ties, telephone poles, fences, decks, and retaining walls. These materials are relatively inexpensive to make and use, and they are just as versatile as any other form of wood. They also have enhanced resistance to microbial and to fungal degradation and to water.

However, the increasing popularity of chemically treated lumber has some negative repercussions which are just now being realized. Chemically treating lumber takes a perfectly useable, recyclable, renewable resource and renders it toxic. For example "pressure treated" or "CCA" lumber is treated with a very poisonous chromated copper arsenic material and can not be burned. While CCA lumber can be buried, the leaching of toxic chemicals makes such disposal strategies much less than desirable. Creosoted lumber requires special incinerators. These materials are becoming far more difficult and expensive to dispose of than to use. However, because of the long useful life of these materials, the economic and environmental impact of chemically treated lumber is just beginning to be felt.

A synthetic replacement for chemically treated lumber would have several advantages. It would slow the cutting of hard and soft-wood forests. It would also eliminate the use of hazardous chemicals associated with chemically treated wood and would eliminate the disposal problems associated therewith.

A number of suggestions have been made for producing lumber substitutes to reduce or eliminate the use of chemically treated wood. Some of these materials have been very successful for specific applications. However, to date, none of these materials have been broadly successful, particularly in structurally demanding applications such as railroad ties.

One product available from Trimax of Long Island Incorporated, 2076 5th. Ave., Ronkonkama, N.Y. 11779 is composed of fiberglass distributed in high density polyethylene ("HDPE"). While the fiberglass includes a silane sizing, it is not a coated fiber material as discussed herein.

Another synthetic lumber product is available from Eaglebrook Products Incorporated, 2650 West Roosevelt Rd., Chicago, Ill. 60608. This material is composed of formed HDPE which does not use fibers. The result is a material with low compressive and flexival modulus and a relatively high thermal expansion coefficient.

A rather interesting approach to recycling unwanted tires was proposed by Murray, U.S. Pat. No. 5,238,734. According to Murray, clean and non-crumbling tires are ground into rubber fragments. The fragments, which can include fiberglass and steel belts, are mixed with an epoxy mixture comprising an oxirane-containing resin and an amine-containing hardening agent and molded into railroad ties. While Murray found a use for a growing environmental problem, namely, the proliferation of tires, it would be even more desirable to produce a composite building material constructed almost entirely of recycled materials. This would provide a market for potentially millions of pounds of recycled plastics per year. Therefore, there is certainly room for improvement. See also U.S. Pat. Nos. 4,137,198; 4,229,497; 4,303,707; 5,053,274 and 5,063,862, all of which relate to plastic-based building materials, some of which may be used for, for example, railroad tie replacements.

SUMMARY OF THE INVENTION

The present invention relates to a composite building material. In a preferred embodiment, the building material has a polymer component and, distributed therein, a coated fiber component made up of coated fibers such as carbon fibers, fiberglass, or a mixture thereof. Not all of the fibers need to be coated. For example, the coated fiber component could consist of coated fiberglass mixed with a fraction of uncoated carbon fibers.

The polymer component includes between about 80 and about 100% HDPE by weight of the polymer component. The polymer component makes up at least about 20% by weight based on the weight of the finished composite building material.

The present invention represents a dramatic improvement in recycling technology in that it provides a composite building material which can be made substantially completely from non-virgin (used) materials. Moreover, the composite building material of the present invention can be made from materials which are often the least desirable in terms of their recyclability and economic value. The resulting composite building material is also recyclable.

For example, many communities now have mandatory recycling for their residences and businesses. Various concerns collect the plastic waste and separate it into various components. PET soda bottles are fairly valuable in recycling and, as such, these materials are further separated from the remainder of the plastics for resale and reuse. What is left, unfortunately, are the misfit plastics or "curbside tailings". These materials often comprise a significant quantity of high-density polyethylene ("HDPE") mixed with an assortment of other plastics such as polyvinyl chloride ("PVC"), polyethylene terephthalate ("PET") (from soda bottles or otherwise), polypropylene ("PP"), polyethylene ("PE"), and other minor components. A typical plastic mix for "curbside tailings" is presented in Table 1.

TABLE 1

PERCENTAGE OF EACH PLASTIC TYPE IN TYPICAL CURBSIDE TAILINGS MIX

| TYPE | CT[1] |
|---|---|
| PET (SODA BOTTLES) | — |
| HDPE, NON-MILK | 90.2 |
| HDPE, MILK + H$_2$O | — |
| PVC | 3.2 |
| PET, NON-SODA | 4.5 |
| PP | 0.5 |
| OTHER (#7) | 1.6 |
| LDPE | — |
| PS | — |

[1]Curbside Tailings As Collected with PET soda and HDPE milk/water bottles removed. Amounts are presented as a percentage of the remaining plastic materials.

Finding a use for these materials makes recycling more profitable as a larger segment of the plastic waste can be meaningfully reused. The present invention also helps reduce the amount of material that is incinerated or sent to a landfill.

The present invention also helps with another consumer waste problem; namely the growing use of fiberglass in composite structural panels, such as those used in automobiles, boats, airplanes, etc. With the exception of the present invention, there are just not many uses for these polymer coated fiberglass matrix materials once their useful life has been reached. In fact, most of this material needs to be buried in land fills.

It has been surprisingly found that by producing a composite building material of curbside tailings and polymer coated fiber, a building material with surprisingly good mechanical properties is obtained. This building material is also resistant to water, resistant to degradation by petrochemicals, microbes and fungus, is heat resistant, is cold resistant and has an increased service life over conventional building materials. Most importantly, these incredibly strong structural materials can be produced totally from recyclable materials and in fact, from some of the least desirable recyclable materials available.

In a particularly preferred embodiment, the present invention provides a plastic composite railroad tie which is resistant to microbial attack, fungi, exposure to fuel and exposure to water. The railroad ties are non-electrically conductive and attached rails will not separate by more than 0.3175 cm under a lateral load of 24,000 lbs. The railroad ties also can withstand a vertical static load of at least 39,000 lbs., and a dynamic vertical load of at least 140,000 lbs. A railroad tie in accordance with the present invention preferably has a compressive modulus of at least about 170,000 psi along the tie's axis, assuming a zero thermal expansion coefficient.

Nowhere are the advantages of the present invention more apparent than in the construction of railroad ties. Traditional creosote treated wood railroad ties do not perform satisfactorily in curves, in high tonnage areas or wet environments. The creosoted lumber is subject to microbial attack, particularly when in wet environments and it poses disposal problems. Steel reinforced concrete railroad ties can be used where wood is inappropriate. However, such railroad ties have been known to fail due to freeze-thaw degradation and the eventual oxidation of the reinforcements. In addition, concrete railroad ties have been found to cause premature failure of the rails. Steel rails have historically suffered from fatigue and lateral stability problems when used in combination with cement railroad ties.

Railroad ties constructed of the materials in accordance with the present invention, however, have an increased service life compared to conventional railroad ties in most applications, a superior resistance to degradation in wet environments and do not cause rail failure. Because of the materials used, the railroad ties in accordance with the present invention also provide a market for millions of tons per year of recycled plastics which, otherwise, no one would want. The present invention also eliminates the use of hazardous chemicals associated with the treating of railroad ties and eliminates the waste disposal problems associated therewith. Finally, the materials in accordance with the present invention can themselves be recycled and used in the construction of new railroad ties.

DETAILED DESCRIPTION OF THE PREFERRED EMBODIMENTS

Figure 1:
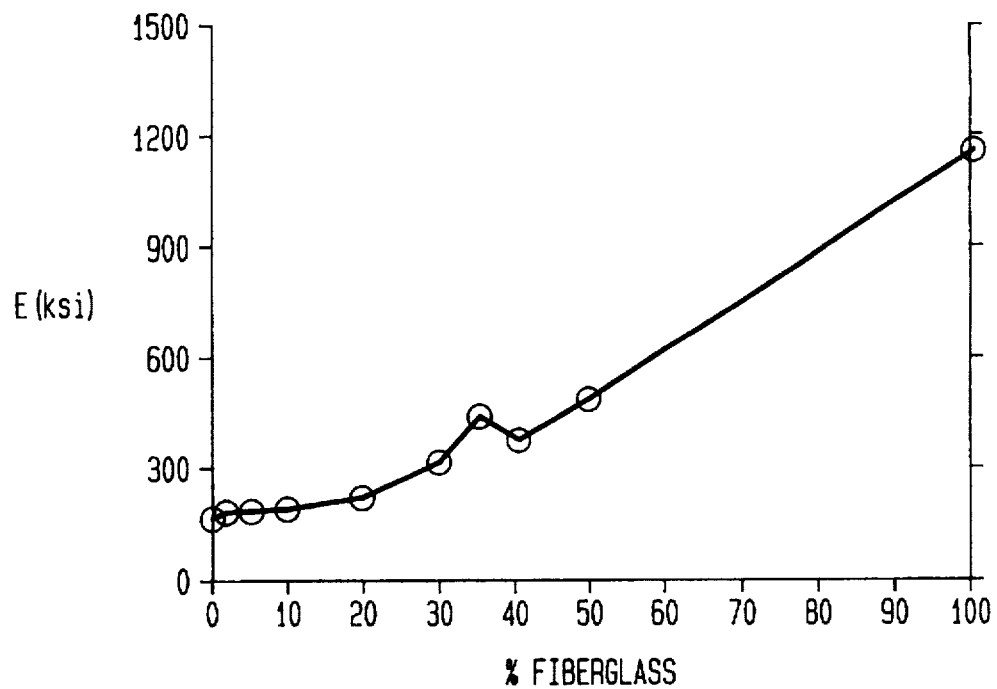
FIG. 1 is a graph illustrating tensile modulus verses the composite composition for injection molded samples.

A composite building material in accordance with the present invention is a plastic based wood substitute comprised of a polymer component and, distributed therein, a coated fiber component. The wood substitute can be formed into dimensional lumber, railroad ties, poles, a simulated tree trunk for use as a telephone poles or guard rail posts or for use in construction of, for example, a pier or boardwalk, and the like.

In accordance with the present invention, the polymer component includes between about 80 and about 100% HDPE. HDPE as used herein refers to high density polyethylene having a density which ranges from between about 0.952 to about 0.965 $g/cm^3$. "About 80%" should be understood to mean that, preferably, the building material of the present invention includes between 80 and 100% HDPE. Preferably, the polymer material includes about 85 to about 100% HDPE and, more preferably, between about 90 and about 100% HDPE. However, depending upon the nature and the distribution of the remaining materials, it may be possible to omit up to an additional 5% by weight of the major polymer component. The balance of the polymer component, generally up to about 20% by weight, but sometimes higher, can be composed of one or more polymers selected from a group consisting of polyvinyl chloride ("PVC"), other forms and densities of polyethylene ("PE"), polypropylene ("PP"), polystyrene ("PS"), and polyethylene terphthalate ("PET"). The balance of the polymer component can also include contaminants such as metal from bottle caps, labels, glues, dyes, residue, paint and dirt. Preferably, however, this contamination makes up only a few (less than 5%) percent of the total weight of the polymer component.

Of course, virgin materials, such as virgin HDPE, or a mixture of virgin HDPE and used HDPE can also be used. However, preferably, at least one of the polymers utilized in the polymer component is recycled, post-consumer waste, or otherwise used waste material. Most preferably, all or nearly all of the components are waste.

In production of the composite building materials of the present invention, there is no need to wash the HDPE, unless it is unusually dirty or contaminated. Instead, the materials are merely mixed and granulated such that they result in a 0.635 cm to about a 7.62 cm nominal granulate material. This is, of course, a measure of average particle size. Much smaller and some larger particles and flakes are useful. Preferably, there will be a nominal granulate of about 0.9525 cm which is determined by the ability of the material to be screened to that size.

In a particularly preferred embodiment, the polymer component is composed of so called "curbside tailings". As previously mentioned, curbside tailings are often that fraction of recyclable waste which is least desirable for commercial resale or reuse. Generally, it is composed of predominantly HDPE from bottles other than milk or water bottles, along with a small percentage of PVC, PET, PP, PS and other materials. Of course, milk, soda, and water bottles can also be useful.

Dispersed within the polymer component is a coated fiber component. The coated fiber component generally consists of fiberglass fibers having a minimum length of about 0.1 mm. The fiberglass fibers preferably have a length of between about 0.5 and about 20.0 mm and more preferably a length of between about 5.0 and about 10.0 mm. Again, this is an average size. A considerable amount of fiberglass dust, or longer fibers, may be used.

The fiber is preferably coated with or embedded within a thermoplastic polymer material such as PP, PE, PS and HDPE. The coated fibers generally include between about 10 and about 90% fiber by weight. Preferably, the fiber is provided in an amount of between about 20 and about 60% and more preferably between about 30 and about 45%, by weight of the coated fibers. The majority of the remaining material is the coating, usually PP. A small amount, often 1% or less of the coated fiber component is a sizing agent known in the industry such as silane. A sizing agent may be useful in compatibilizing the polymer coating and the polymer component.

Again, virgin materials i.e. virgin fiberglass and additional thermoplastic polymer could be used in accordance with the present invention. Even so, it would be preferable to coat the fibers with the coating polymer prior to granulating the fibers and mixing them with the polymer component. Preferably, fiber imbedded in a polymer matrix, such as those used in automobile components, are used. This material usually comes as a flat sheet or an already formed structural component consisting of a fibrous mat of oriented and/or random fibers coated with a polymer matrix. Like the polymer component, the coated fiber component does not require special handling or washing prior to use. It should be handled like any other fiberglass or fiber material. It is granulated just like the polymer component as previously described herein.

The composite building material in accordance with the present invention preferably contains between about 50 and about 75% of the polymer component by weight based on the weight of the finished composite building material. In certain formulation, however, it may be possible to use or replace up to another 10% of the polymer component with coated and/or uncoated fiber reinforcing materials or fillers. More particularly, in accordance with the present invention, the coated fiber is provided in an amount of between about 30 to about 40% by weight based on the weight of the finished composite building material and, most preferably, the coated fiber material can be provided in an amount about 35% by weight.

If, however, the coated fiber component was to include a particularly high coating percentage, it may be desirable to increase the overall content of the coated fiber relative to the amount of polymer component used. The reverse is also true. In any event, however, one would probably not use less than about 20% polymer component by weight or less than about 10% coated fiber material.

Figure 2:
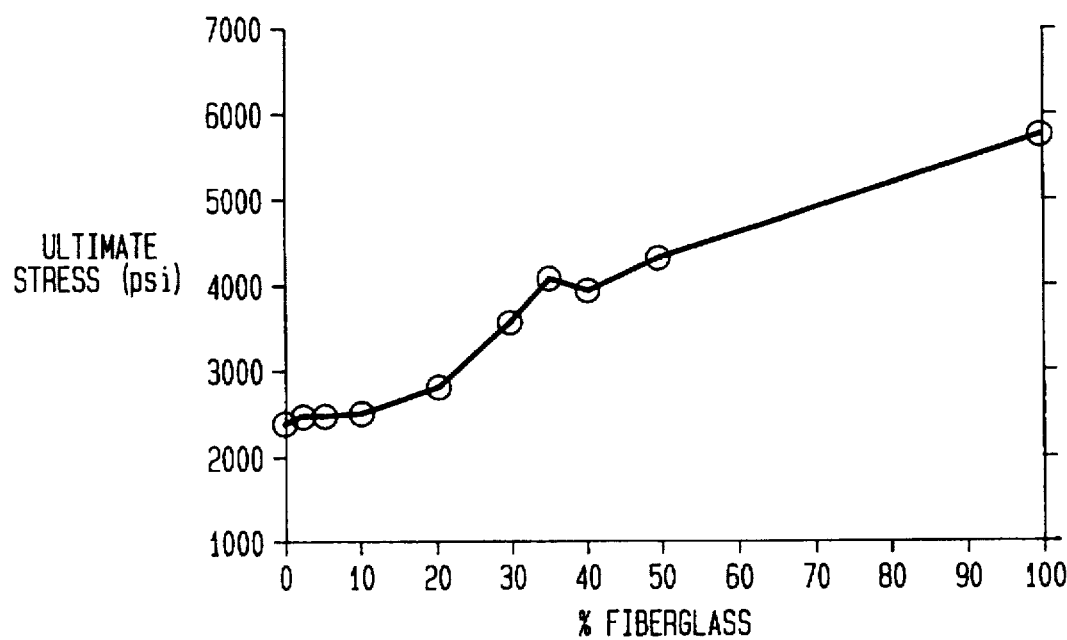
FIG. 2 is a graph illustrating the tensile stress characteristics (strength) of materials according the present invention.

The reason why a coated fiber content of 35% is preferred in accordance with the present invention is illustrated in FIGS. 1 and 2. FIG. 1 illustrates the tensile modulus verses the composite composition for injection molded samples. ASTM Test No. D638 was used for these determinations. As the amount of coated fiber, in this case coated fiberglass (x-axis) increases, so to does the tensile modulus "E" (y-axis). The progression is relatively consistent until the region of 30 to 50% coated fiber is reached. At about 35%, the tensile modulus increases to a relative maximum whereby the tensile modulus equals that of a composite including 45 to 50% coated fiber. Thus a composite building material composed of 35% coated fibers will have the strength of a composite containing up to about 50% coated fiber. However, with less coated fiber, the resulting composite is lighter. The lower fiber content material is also much easier on the extruding equipment as the fiber can act as an abrasive. The composite material also has stress characteristics equal to that of a material containing 45 to 50% coated fiberglass scrap. See FIG. 2 showing ultimate stress ( a.k.a. strength) (y-axis) verses composition (along the x axis).

The composite building material can be foamed, particularly when higher fiber contents are used. This will help to offset the increased weight based on the fiber content. Foaming provides lighter weight, the use of less fiber (which is easier on the extruder) and greater throughput. This is particularly useful in accordance with the present invention as the present invention is capable of providing material with properties greatly in excess of that needed for numerous applications. Therefore, foaming, which generally sacrifices mechanical properties for manufacturing efficiency and weight, will often not be a problem.

In general, the composite building material can be made by granulating curbside tailings and automobile structural panels to form, for example, a ⅛ inch nominal granulate. These materials are then mixed in the desired proportion to form a homogeneous mixture of granulate and/or flake. The mixed granulated curbside tailings and granulated coated fiberglass from automobile structural panels are then placed into the hopper of an extruder. Any type of extruder can be used in accordance with the present invention. The mixed materials are then melted, mixed and transported to a die or a mold as is known in the art.

It is interesting to note that the present invention yields building materials that are unique in terms of structure. It is know that at the skin of the mold or the aperture of the die, fibers are slowed, elongated and highly oriented in the direction of flow. However, that effect, also known as shear, diminishes quickly the deeper into the component one goes. It has been found, however, in accordance with the present invention, that the use of coated fibers in an HDPE matrix results in a highly oriented, more uniform alignment which can be observed to a far greater depth than expected. This is believed to provide a much greater orientation of mechanical properties over the entire length of the building material produced. As the numbers reported in Example 1 indicate, the present invention provides a material with tremendously enhanced mechanical properties, even with a relatively reduced level of actual fiber content. Without wishing to be bound by any particular theory of operation, it is believed that the thermoplastic coating of fibers assists in providing the unusual degree and depth of fiber orientation obtained in accordance with the present invention. This orientation effect is believed to be the key to the vastly superior properties exhibited by the present invention, even when compared to lumber containing a much higher fiberglass content, such as Trimax.

For certain applications such as, for example, railroad ties, it is important that the composite building material exhibit some very specific properties. For example, the material must be non-water or fuel absorbent, resistant to degradation and wear, resistant to the typical range of temperatures through which train tracks are exposed and non-conductive. In addition, the railroad ties must meet certain mechanical criteria. For example, the plastic composite railroad tie will have a compressive modulus of at least about 170,000 psi along the tie's axis. By the term "tie's axis" it is meant the longest axis of the railroad tie. Compressive modulus is a measure of stiffness which was measured by ASTM Test No. D695 which was modified to use full sized lumber as produced (full cross-section) cut down to length. More preferably, the composite building material useful as a railroad tie will have a compressive modulus of at least 200,000 psi and even more preferably 225,000 psi. Most preferably, when use for railroad ties, the plastic material will have a compressive modulus of at least about 250,000 psi.

S The present invention is particularly well suited for railroad ties because of the different properties exhibited by the composite building materials along different axes.

Because of the highly oriented fiber content in the direction of the flow (the long axis of a railroad tie), the tie exhibits incredible strength and rigidity along that axis. At the same time, in a perpendicular axis which cuts across the orientation of the fiber content, the tie is relatively softer and flexible. Thus, a railroad tie made from the composite building material in accordance with the present invention will not bend or stress rail laid perpendicularly thereon, as there is some give in that direction. However, because of the strength of the tie along the tie's longest axis, rails attached thereto will not be allowed to shift laterally or separate. For this reason, the railroad ties of the present invention are vastly superior to either wood or concrete ties currently employed.

In addition, in terms of railroad ties, it is important that rails attached thereto not be separated by more than about 0.3175 cm when placed under a lateral load of at least about 24,000 lbs. Lateral load refers to the outward pressure exerted by the train's wheels on the rails. The composite building material should also bear a vertical static load of at least about 39,000 lbs. This measures a tie's ability to stand up to having a train parked on top of it without squishing, or having the rail driven into the tie. A vertical dynamic load of at least 140,000 lbs. is also required. This measures the ability of a tie to handle train traffic.

EXAMPLES

In all of the examples the following production protocol was used. The granulated polymer component was loaded into a 7 cubic yard cylindrical blender having internal directional valves and mixed for about 15 min. Thereafter, the granulated coated fiberglass was added to the blender and mixing continued for about another 15 min. Total blending time was about 30 min. The mixture was then charged to the input hopper of a 6 inch Hartig extruder. The extruder was set at 24:1 L/D and was vented. The extruder had five zones set at the following temperatures: 385°, 390°, 395°, 400°, and 400° F. respectively. The manifold was heated to 375° F. The materials were extruded into molds. However, these materials could have been continuously extruded as well. All samples were water cooled for 3 hrs. and then air cooled overnight or for about 8 hrs.

EXAMPLE 1

Four inch by four inch by eight foot lumber (4"×4"×8") was produced as described above. The polymer component consisted of curbside tailings having an HDPE content in excess of 90%. Coated fiberglass from ground automobile bumpers were also used. The materials tested included coated fiber contents of 0%, 10% or 35% with a fiberglass contents of 0%, 3–4%, and 12–14% respectively. (Based on the weight of the finished building composite material.) The amount of coated fiber used is listed along the top of Table 2. The Trimax material was purchase commercially and had the following dimensions: 3.5 inches by 3.5 inches by 8 feet. Trimax has a fiberglass content of 35%.

TABLE 2

|  | 0% | 10% | 35% | Trimax |
|---|---|---|---|---|
| Flex Modulus | 143,000 | 155,000 | 362,000 | 339,000 |
| Flex Strength | 2050 | 2310 | 4220 | 2750 |

TABLE 2-continued

|  | 0% | 10% | 35% | Trimax |
|---|---|---|---|---|
| Compressive Modulus | 188,300 | 190,000 | 428,100 | 243,700 |
| Compressive Strength | 3,900 | 3,600 | 3,800 | 1,930 |

All reported in pounds per square inch—psi. Flex modulus and flex strength were measure using ASTM Test No. D790 modified to allow for the use of full sized samples using "as produced" materials.

These results demonstrate the superiority of the composite building materials of the present invention. Not only did the lumber produced in accordance with the present invention have a better flex modulus, but it also exhibited over a 53% increase in flex strength. This is 5 particularly surprising since strength is a function of a number of factors including fiber content. The material of the present invention produced using a 35% coated fiber content actually had more than 50% less fiberglass than the comparable Trimax material yet it was over 53% stronger. The superiority of the present invention is even more pronounced when the compressive forces are considered. The present invention had a compressive modulus of about 76% greater than Trimax and a compressive strength which was about 97% greater than Trimax. The compressive characteristics of the composite lumber is the key to its utility as a railroad tie.

As shown in Table 3, the composite material of the present invention also has about a 31% lower thermal expansion coefficient when compared to Trimax and about 50% less than traditional plastic lumber.

TABLE 3

| Plastic Lumber | $7.4 \times 10^{-5}$ |
|---|---|
| Trimax | $5.1 \times 10^{-5}$ |
| Present Invention (35% coated fiberglass) | $3.5 \times 10^{-5}$ |

Measured in inch per inch per degree F.

EXAMPLE 2

A railroad tie was produced which was seven inches by nine inches by ten feet (7"×9"10') and tested as previously described.

|  | 0% | 35% |
|---|---|---|
| Flex Modulus | 98,000 | 310,000 |
| Flex Strength | 2,000 | 4,100 |

Measured in psi

We claim:

1. A composite building material comprising: a polymer component and distributed therein 10 to 80% by weight of a thermoplastic-coated fiber component based on the weight of the finished composite building material wherein said thermoplastic-coated fiber has a minimum length of about 0.1 mm and wherein said polymer component contains between about 80 and about 100% by weight of HDPE based on the weight of said polymer component.

2. The composite building material of claim 1, wherein said polymer component includes between about 85 and about 100% HDPE by weight.

3. The composite building material of claim 2, wherein said polymer component includes between about 90 and about 100% HDPE by weight.

4. The composite building material of claim 1, further comprising up to 20% by weight, based on the weight of said polymer component, of at least one polymer selected from the group consisting of PVC, PE, PP, LDPE, PS and PET.

5. The composite building material of claim 1 wherein said coated fiber is coated with a thermoplastic material selected from the group consisting of PP, PE, PS, and HDPE.

6. The composite building material of claim 1 wherein said coated fiber includes a sizing agent.

7. The composite building material of claim 5 wherein said coated fiber includes a sizing agent.

8. The composite building material of claim 1 wherein said coated fiber component is present in an amount of between about 25 and about 50% by weight based on the weight of the finished composite building material.

9. The composite building material of claim 8 wherein said coated fiber component is present in an amount of between about 30 and about 40% by weight based on the weight of the finished composite building material.

10. The composite building material of claim 9 wherein said coated fiber component is present in an amount of between about 35% by weight based on the weight of the finished composite building material.

11. The composite building material of claim 1 wherein said coated fiber has a length of between about 0.5 and about 20 mm.

12. The composite building material of claim 11 wherein said coated fiber has a length of between about 5.0 and about 10.0 mm.

13. The composite building material of claim 1, wherein said coated fiber is coated fiberglass.

14. The composite building material of claim 1 having a compressive modulus of at least about 170,000 psi along an axis.

15. The composite building material of claim 11 having a compressive modulus of at least about 200,000 psi along an axis.

16. The composite building material of claim 12 having a compressive modulus of at least about 250,000 psi along an axis.

17. The composite building material of claim 1 wherein said coated fiber contains between about 10 and about 90% fiber content by weight.

18. The composite building material of claim 17 wherein said coated fiber contains between about 20 and about 60% fiber content by weight.

19. The composite building material of claim 18 wherein said coated fiber contains between about 30 and about 45% fiber content by weight.

20. The composite building material of claim 8 wherein said coated fiber contains between about 20 and about 60% fiber content by weight.

21. The composite building material of claim 20 wherein said coated fiber contains between about 30 and about 45% fiber content by weight.

22. The composite building material of claim 1 wherein at least a portion of said polymer component or said coated fiber component is a recycled material.

* * * * *

UNITED STATES PATENT AND TRADEMARK OFFICE
CERTIFICATE OF CORRECTION

PATENT NO. : 5,789,477
DATED : August 4, 1998
INVENTOR(S) : Nosker et al.

It is certified that error appears in the above-identified patent and that said Letters Patent is hereby corrected as shown below:

Column 6, line 65, delete "S".

Column 7, line 48, " 8" " should read --8'--

Column 8, line 19, "is 5 particularly" should read --is particularly--.

Signed and Sealed this

Eighth Day of December, 1998

Attest:

BRUCE LEHMAN

Attesting Officer

Commissioner of Patents and Trademarks